United States Patent
Hammonds

(10) Patent No.: US 12,428,047 B2
(45) Date of Patent: Sep. 30, 2025

(54) SHOPPING CART KICKSTAND BRAKE

(71) Applicant: Thomas L Hammonds, Charlotte, NC (US)

(72) Inventor: Thomas L Hammonds, Charlotte, NC (US)

( * ) Notice: Subject to any disclaimer, the term of this patent is extended or adjusted under 35 U.S.C. 154(b) by 370 days.

(21) Appl. No.: 18/121,051

(22) Filed: Mar. 14, 2023

(65) Prior Publication Data

US 2024/0092410 A1 Mar. 21, 2024

Related U.S. Application Data

(60) Provisional application No. 63/372,518, filed on Mar. 21, 2022.

(51) Int. Cl.
*B62H 1/06* (2006.01)
*B62B 5/04* (2006.01)

(52) U.S. Cl.
CPC ............ *B62B 5/049* (2013.01); *B62B 5/0438* (2013.01)

(58) Field of Classification Search
CPC ......... B62B 5/049; B62B 5/0438; B62H 1/06; B60T 1/14
USPC .................. 188/5, 19, 23; 280/304
See application file for complete search history.

(56) References Cited

U.S. PATENT DOCUMENTS

| | | | | |
|---|---|---|---|---|
| 5,794,950 A * | 8/1998 | Svensson | ............... | A63C 17/26 280/11.214 |
| 5,865,445 A * | 2/1999 | Svensson | ............... | A63C 17/26 280/11.214 |
| 6,845,999 B2 * | 1/2005 | Royal, Sr. | ................ | B62H 1/12 280/304 |
| 9,266,574 B1 * | 2/2016 | Lippman | ................. | B62H 1/12 |
| 10,780,931 B2 * | 9/2020 | Siwicki | .................... | F15B 1/26 |
| 11,939,018 B2 * | 3/2024 | Sadberry | ................ | B62H 1/06 |
| 2005/0082775 A1 * | 4/2005 | Slager | .................... | B62B 5/049 280/33.992 |
| 2005/0156403 A1 * | 7/2005 | Labonte | .................. | B62H 1/00 280/304 |
| 2019/0351962 A1 * | 11/2019 | Siwicki | .................... | F15B 1/26 |
| 2021/0387687 A1 * | 12/2021 | Sadberry | ................ | B62H 1/06 |

* cited by examiner

*Primary Examiner* — Thomas W Irvin
(74) *Attorney, Agent, or Firm* — Kyle A. Fletcher, Esq.

(57) ABSTRACT

The shopping cart kickstand brake includes a brake unit and a control unit. The shopping cart kickstand brake may be a braking device that may prevent a shopping cart from rolling over a surface by deploying a kickstand. As non-limiting examples, the surface may comprise a parking lot, a sidewalk, or a floor. The brake unit may be coupled to the bottom of the shopping cart. The brake unit may deploy and retract the kickstand. The control unit may be coupled to a handle of the shopping cart. The control unit may be adapted for a user to control extension and retraction of the kickstand.

19 Claims, 6 Drawing Sheets

SHOPPING CART KICKSTAND BRAKE

CROSS REFERENCES TO RELATED APPLICATIONS

This application claims the benefit of priority to U.S. Provisional Application No. 63/372,518, filed Mar. 21, 2022, which is incorporated by reference herein in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of shopping carts and braking systems, more specifically, a shopping cart kickstand brake.

SUMMARY OF INVENTION

The shopping cart kickstand brake comprises a brake unit and a control unit. The shopping cart kickstand brake may be a braking device that may prevent a shopping cart from rolling over a surface by deploying a kickstand. As non-limiting examples, the surface may comprise a parking lot, a sidewalk, or a floor. The brake unit may be coupled to the bottom of the shopping cart. The brake unit may deploy and retract the kickstand. The control unit may be coupled to a handle of the shopping cart 900. The control unit may be adapted for a user to control extension and retraction of the kickstand.

An object of the invention is to prevent a shopping cart form rolling over a surface when a kickstand is deployed from a brake unit located on the bottom of the frame of the shopping cart.

Another object of the invention is to provide a linear actuator to deploy and retract the kickstand.

A further object of the invention is to provide a control unit coupled to the handle of the shopping cart such that a user may control the deployment and retraction of the kickstand.

Yet another object of the invention is to provide a rechargeable battery to power a motor in the linear actuator.

These together with additional objects, features and advantages of the shopping cart kickstand brake will be readily apparent to those of ordinary skill in the art upon reading the following detailed description of the presently preferred, but nonetheless illustrative, embodiments when taken in conjunction with the accompanying drawings.

In this respect, before explaining the current embodiments of the shopping cart kickstand brake in detail, it is to be understood that the shopping cart kickstand brake is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shopping cart kickstand brake.

It is therefore important that the claims be regarded as including such equivalent construction insofar as they do not depart from the spirit and scope of the shopping cart kickstand brake. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
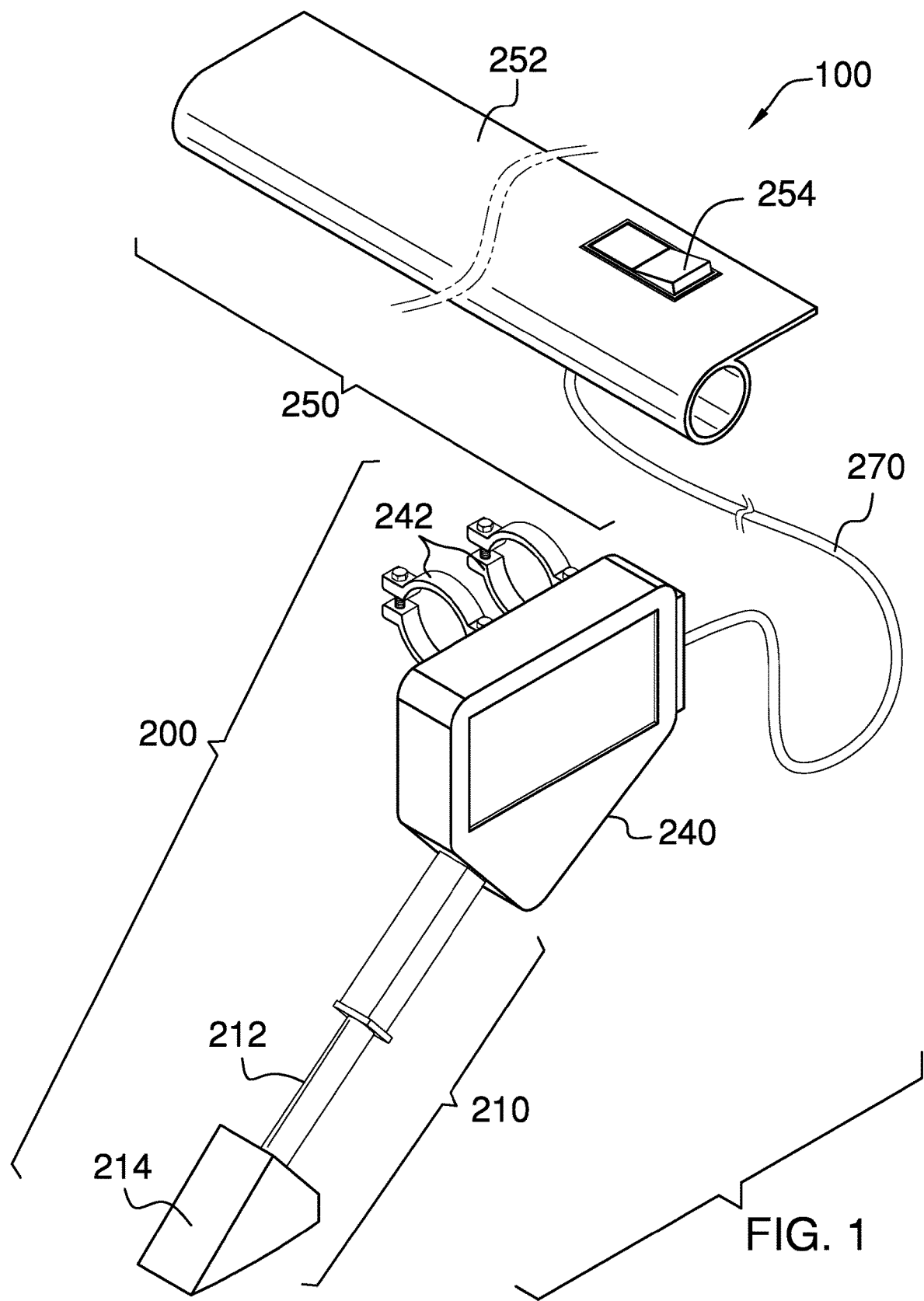
FIG. 1 is an isometric view of an embodiment of the disclosure.
Figure 2:
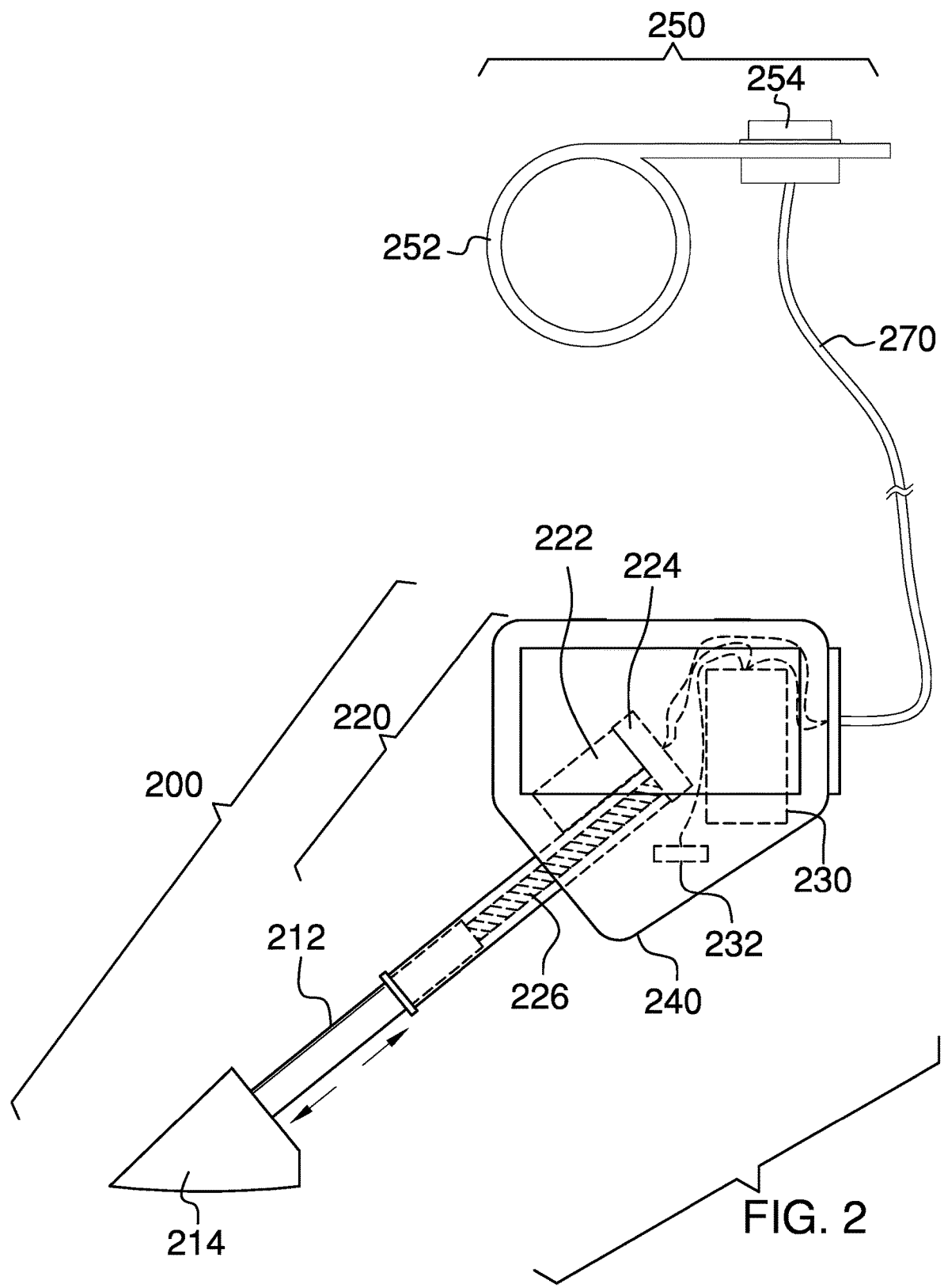
FIG. 2 is a left side view of an embodiment of the disclosure.
Figure 3:
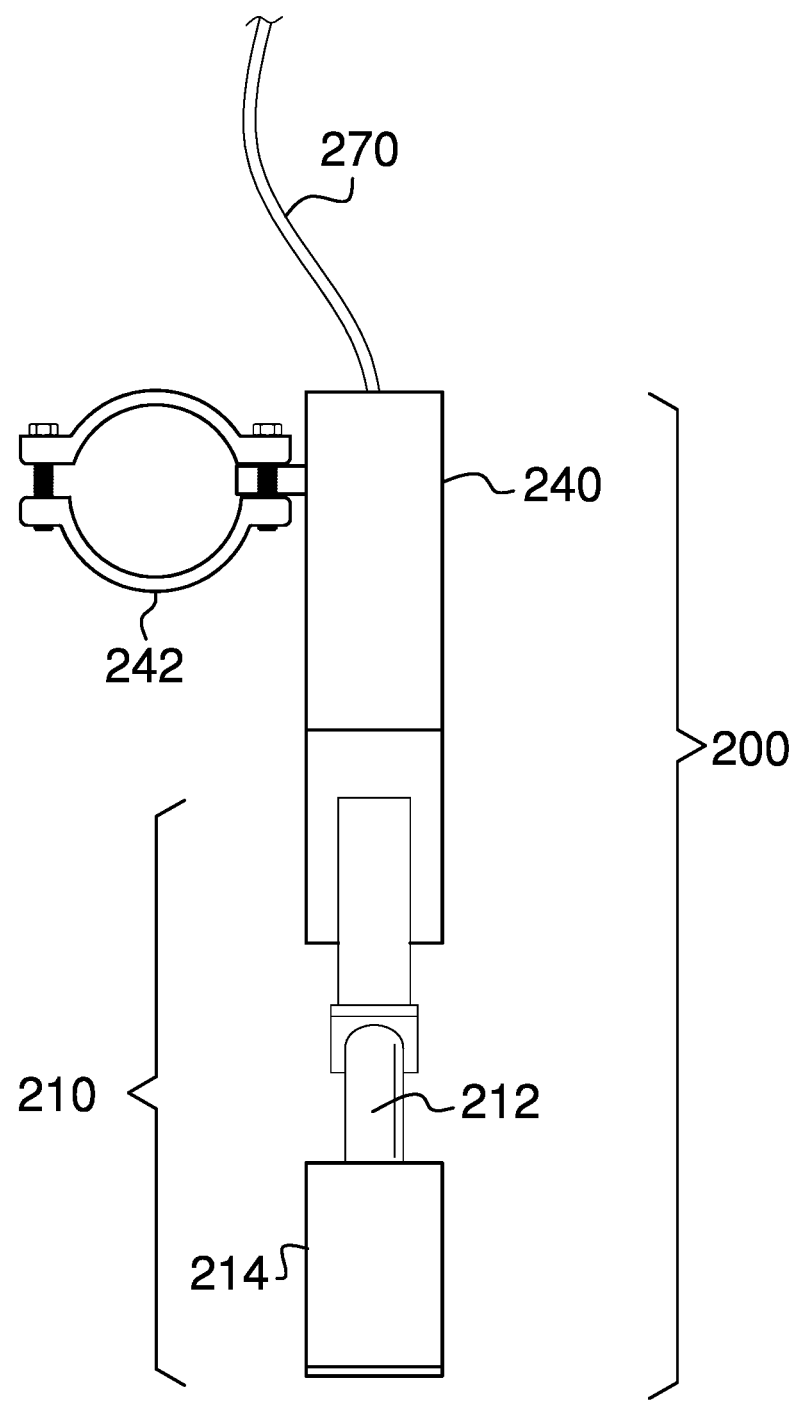
FIG. 3 is a front view of an embodiment of the disclosure.
Figure 4:
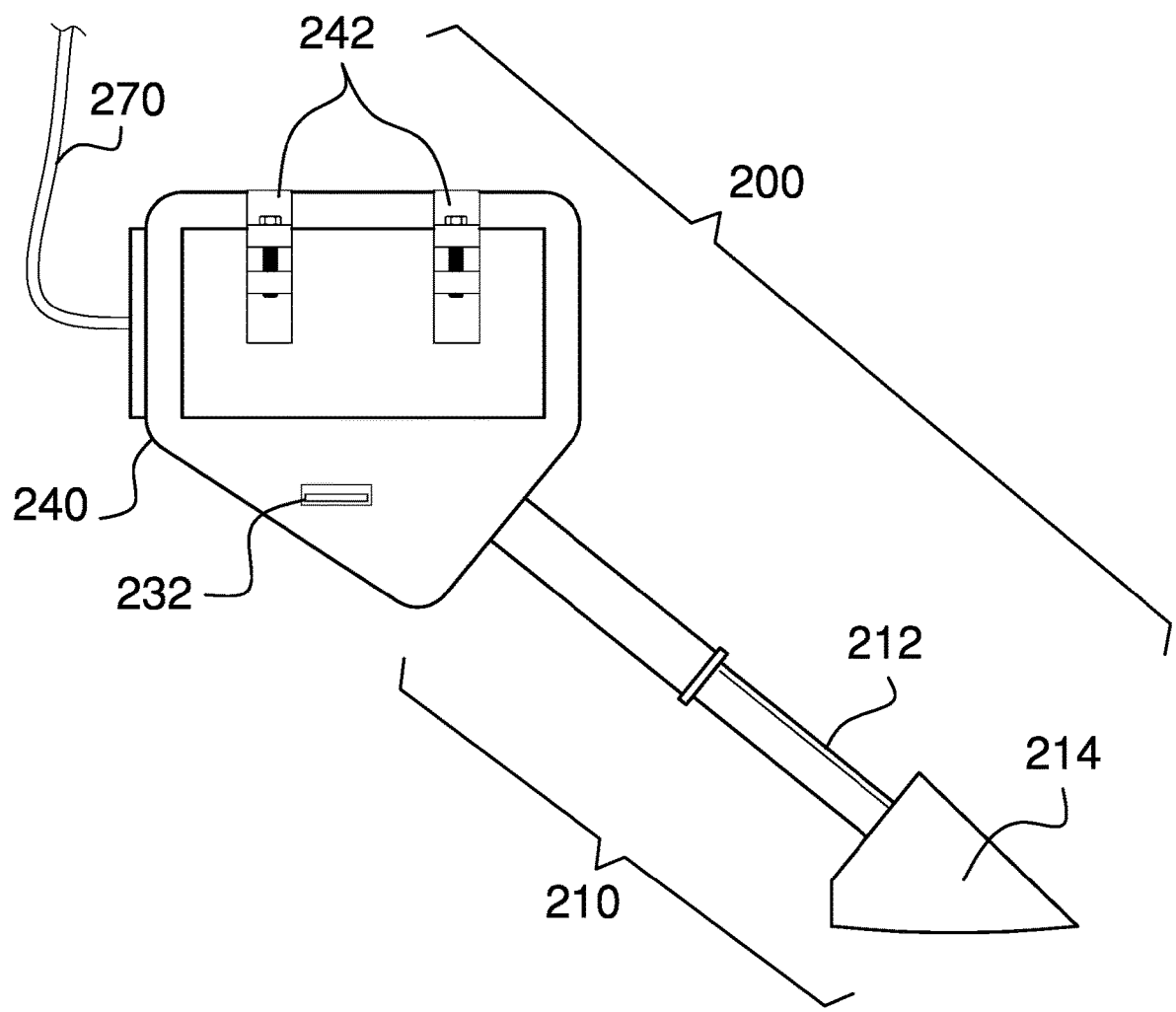
FIG. 4 is a right side view of an embodiment of the disclosure.
Figure 5:
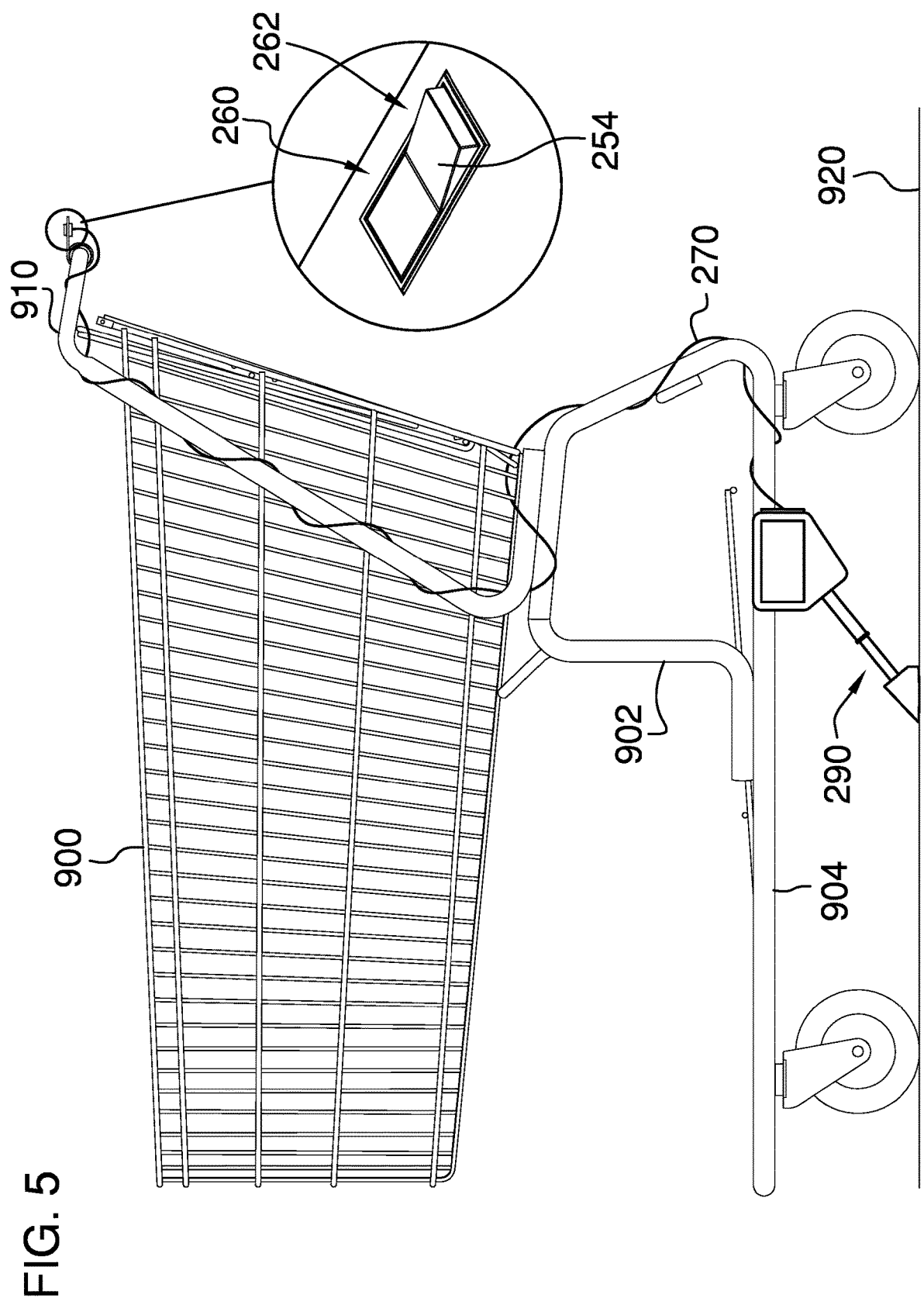
FIG. 5 is an in-use view of an embodiment of the disclosure, illustrating the kickstand in the DEPLOYED position.
Figure 6:
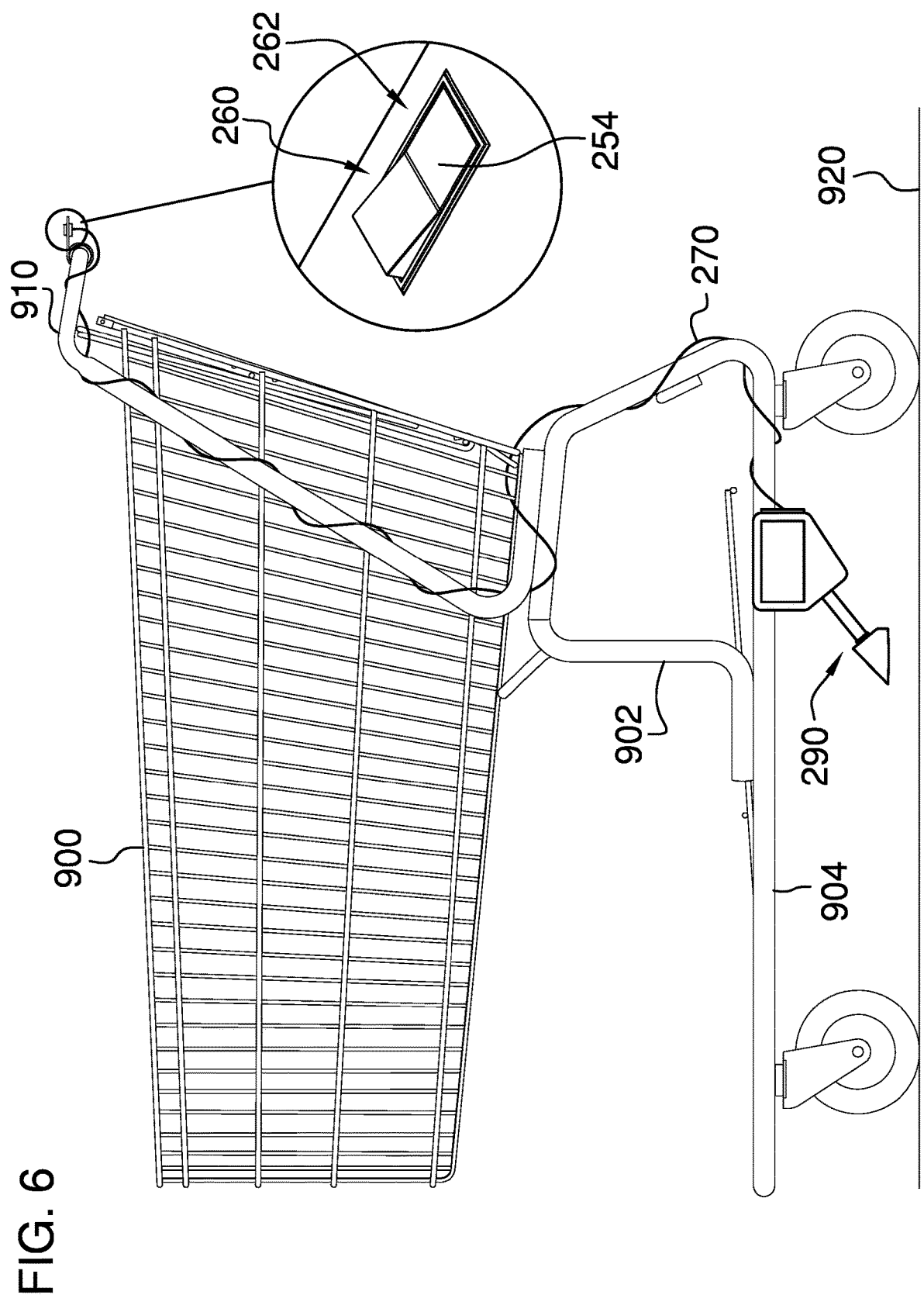
FIG. 6 is an in-use view of an embodiment of the disclosure, illustrating the kickstand in the RETRACTED position.

Detailed reference will now be made to a first potential embodiment of the disclosure, which is illustrated in FIGS. 1 through 6.

The shopping cart kickstand brake 100 (hereinafter invention) comprises a brake unit 200 and a control unit 250. The invention 100 may be a braking device that may prevent a shopping cart 900 from rolling over a surface 920 by deploying a kickstand 210. As non-limiting examples, the surface 920 may comprise a parking lot, a sidewalk, or a floor. The brake unit 200 may be coupled to the bottom of the shopping cart 900. The brake unit 200 may deploy and retract the kickstand 210. The control unit 250 may be coupled to a handle 910 of the shopping cart 900. The control unit 250 may be adapted for a user to control extension and retraction of the kickstand 210.

The brake unit 200 may be coupled to a bottom side member 904 of a frame 902 of the shopping cart 900. The brake unit 200 may comprise the kickstand 210 and a linear actuator 220. The kickstand 210 may be moved between a DEPLOYED position 290 and a RETRACTED position 292 by the linear actuator 220. In the DEPLOYED position 290, the kickstand 210 may extend from the brake unit 200 to the surface 920 and may make contact with the surface 920. The distal end of the kickstand 210 may comprise a kickstand foot 214 that may contact the surface 920. In some embodiments, the kickstand foot 214 may comprise a non-skid surface to prevent movement of the shopping cart 900 due to sliding of the kickstand 210. In the RETRACTED position 292, the kickstand 210 may be retracted away from the surface 920 such that the kickstand 210 may be lifted above the surface 920.

The kickstand 210 may comprise a telescoping shaft 212 and the kickstand foot 214. The telescoping shaft 212 may be operable to change length under control of the linear actuator 220. The upper end of the telescoping shaft 212 may be coupled to the linear actuator 220. The lower end of the telescoping shaft 212 may be coupled to the kickstand foot 214. In some embodiments, the telescoping shaft 212 may be oriented at an oblique angle relative to the surface 920.

The linear actuator 220 may be a device that produces linear motion responsive to energization by an electrical potential. The linear actuator 220 may be coupled to the telescoping shaft 212 such that the linear actuator 220 may extend and retract the kickstand 210 during energization.

As a non-limiting example, the linear actuator 220 may comprise a motor 222, a plurality of gears 224, and a leadscrew 226. The motor 222 may be coupled to the plurality of gears 224 and the plurality of gears 224 may, in turn, be coupled to the upper end of the leadscrew 226. Energization of the motor 222 by the electrical potential may cause rotation of the leadscrew 226 via the plurality of gears 224. Rotation of the leadscrew 226 may cause linear motion of the telescoping shaft 212 as the leadscrew 226 turns in a threaded upper end of the telescoping shaft 212.

Energizing the motor 222 with the electrical potential having a first electrical polarity may cause the leadscrew 226 to rotate in a first rotational direction and may deploy the kickstand 210 by extending the telescoping shaft 212. Energizing the motor 222 with the electrical potential having a second electrical polarity may cause the leadscrew 226 to rotate in a second rotational direction and may retract the telescoping shaft 212. De-energizing the motor 222 may cause the leadscrew 226 to stop and/or remain stationary.

The range of motion of the telescoping shaft 212 may be determined by a pair of limit switches located at opposing ends of the leadscrew 226. The pair of limit switches may interrupt the electrical potential that would cause continued motion towards the DEPLOYED position 290 once the kickstand 210 is fully deployed and may interrupt the electrical potential that would cause continued motion towards the RETRACTED position 292 once the kickstand 210 is fully retracted.

One or more batteries 230 may comprise one or more energy-storage devices. The one or more batteries 230 may be a source of electrical energy to operate the motor 222. The one or more batteries 230 may be rechargeable and/or replaceable. In some embodiments, the one or more batteries 230 may be recharged from an external battery charger that may be detachably coupled to a recharging port 232.

The linear actuator 220, the kickstand 210, the one or more batteries 230, and the recharging port 232 may be housed within a brake unit housing 240. The brake unit housing 240 may couple to the bottom side member 904 via one or more clamps 242.

The control unit 250 may comprise a control panel 252 and an operator control 254. The operator control 254 may be coupled to the control panel 252. The control panel 252 may be coupled to the handle 910 of the shopping cart 900 such that the operator control 254 is convenient for the user to access.

The operator control 254 may be an electrical control that controls energization of the motor 222. The operator control 254 may comprise a DEPLOY position 260 and a RETRACT position 262. In the DEPLOY position 260, the operator control 254 may energize the motor 222 with the first electrical polarity such that the kickstand 210 moves to the DEPLOYED position 290. In the RETRACT position 262, the operator control 254 may energize the motor 222 with the second electrical polarity such that the kickstand 210 moves to the RETRACTED position 292.

The operator control 254 may be coupled to the brake unit 200 via wiring 270 that traverses the frame 902 of the shopping cart 900.

In use, a shopping cart 900 may be pushed over a surface 920 with the kickstand 210 in the RETRACTED position 292. Upon reaching a destination, the user may move the operator control 254 to the DEPLOY position 260 and the motor 222 may be energized such that the kickstand 210 moves to the DEPLOYED position 290 and contacts the surface 920. As a non-limiting example, the kickstand 210 may prevent the shopping cart 900 from rolling while being unloaded into a vehicle located in a parking lot. The operator control 254 may subsequently be moved to the RETRACT position 262 to retract the kickstand 210 and permit movement of the shopping cart 900.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "brake" may be a device that is used to slow or stop the motion of a machine or a vehicle.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "deploy" may refer to configuring a device to place the device into service or to make the device ready for service. As non-limiting examples, "deployed" may be synonymous with extended, unfolded, inflated, erected, or activated. As non-limiting examples, a device that is not deployed may be referred to as retracted, folded, deflated, withdrawn, collapsed, stowed, or deactivated.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "energize" and/or "energization" may refer to the application of an electrical potential to a system or subsystem. "De-energize" and/or "de-energization" may refer to the removal of the electrical potential.

As used herein, "handle" may refer to an object or aperture by which a tool, object, or door is held or manipulated with the hand.

As used in this disclosure, a "housing" may be a rigid or semi-rigid casing that encloses and protects one or more devices.

As used herein, a "linear actuator" may be a device that produces linear motion. The device may be electromechanical, hydraulic, or pneumatic in nature. Upon activation by an electrical potential or by a change in fluid or air pressure, the overall length of the device may change—either by lengthening or shortening.

As used in this disclosure, a "motor" may refer to a device that transforms energy from an external power source into mechanical energy.

As used herein, "oblique angle" may refer to any angle that is not a right angle or a multiple of a right angle.

As used herein, "shopping cart" may refer to a wheeled basket that may be used by a shopper to collect and transport items that the shopper intends to purchase and/or to transport purchased items to their vehicle. Shopping carts are typically constructed of metal or plastic and may be designed to nest within each other when not in use such that minimal floor space is required to store unused shopping carts.

As used in this disclosure, "telescopic", "telescoping", and "telescopically" may refer to an object made of two or more sections that fit or slide into each other such that the object can be made longer or shorter by adjusting the relative positions of the sections.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A shopping cart kickstand brake comprising:
a brake unit and a control unit;
wherein the shopping cart kickstand brake is a braking device that prevents a shopping cart from rolling over a surface by deploying a kickstand;
wherein the brake unit is coupled to the bottom of the shopping cart;
wherein the brake unit deploys and retract the kickstand;
wherein the control unit is coupled to a handle of the shopping cart;
wherein the control unit is adapted for a user to control extension and retraction of the kickstand;
wherein the linear actuator comprises a motor, a plurality of gears, and a leadscrew;
wherein the range of motion of the telescoping shaft is determined by a pair of limit switches located at opposing ends of the leadscrew;
wherein the pair of limit switches interrupts the electrical potential that would cause continued motion towards a DEPLOYED position once the kickstand is fully deployed and interrupts the electrical potential that would cause continued motion towards a RETRACTED position once the kickstand is fully retracted.

2. The shopping cart kickstand brake according to claim 1
wherein the brake unit is coupled to a bottom side member of a frame of the shopping cart;
wherein the brake unit comprises the kickstand and a linear actuator;
wherein the kickstand is moved between the DEPLOYED position and the RETRACTED position by the linear actuator.

3. The shopping cart kickstand brake according to claim 2
wherein in the DEPLOYED position, the kickstand extends from the brake unit to the surface and makes contact with the surface;
wherein the distal end of the kickstand comprises a kickstand foot that contacts the surface.

4. The shopping cart kickstand brake according to claim 3 wherein the kickstand foot comprises a non-skid surface to prevent movement of the shopping cart due to sliding of the kickstand.

5. The shopping cart kickstand brake according to claim 3
wherein in the RETRACTED position, the kickstand is retracted away from the surface such that the kickstand is lifted above the surface.

6. The shopping cart kickstand brake according to claim 5
wherein the kickstand comprises a telescoping shaft and the kickstand foot;
wherein the telescoping shaft is operable to change length under control of the linear actuator.

7. The shopping cart kickstand brake according to claim 6
wherein the upper end of the telescoping shaft is coupled to the linear actuator;
wherein the lower end of the telescoping shaft is coupled to the kickstand foot.

8. The shopping cart kickstand brake according to claim 7
wherein the telescoping shaft is oriented at an oblique angle relative to the surface.

9. The shopping cart kickstand brake according to claim 7
wherein the linear actuator is a device that produces linear motion responsive to energization by an electrical potential;
wherein the linear actuator is coupled to the telescoping shaft such that the linear actuator extends and retract the kickstand during energization.

10. The shopping cart kickstand brake according to claim 9
wherein the motor is coupled to the plurality of gears and the plurality of gears are coupled to the upper end of the leadscrew;
wherein energization of the motor by the electrical potential causes rotation of the leadscrew via the plurality of gears.

11. The shopping cart kickstand brake according to claim 10
wherein rotation of the leadscrew causes linear motion of the telescoping shaft as the leadscrew turns in a threaded upper end of the telescoping shaft.

12. The shopping cart kickstand brake according to claim 11
wherein energizing the motor with the electrical potential having a first electrical polarity causes the leadscrew to rotate in a first rotational direction and deploy the kickstand by extending the telescoping shaft.

13. The shopping cart kickstand brake according to claim 12
wherein energizing the motor with the electrical potential having a second electrical polarity causes the leadscrew to rotate in a second rotational direction and retract the telescoping shaft.

14. The shopping cart kickstand brake according to claim 13
wherein de-energizing the motor causes the leadscrew to stop and/or remain stationary.

15. The shopping cart kickstand brake according to claim 14
wherein one or more batteries comprise one or more energy-storage devices;
wherein the one or more batteries are a source of electrical energy to operate the motor;
wherein the one or more batteries are rechargeable and/or replaceable.

16. The shopping cart kickstand brake according to claim 15
wherein the one or more batteries are recharged from an external battery charger that is detachably coupled to a recharging port.

17. The shopping cart kickstand brake according to claim 16
wherein the linear actuator, the kickstand, the one or more batteries, and the recharging port are housed within a brake unit housing;
wherein the brake unit housing couples to the bottom side member via one or more clamps.

18. The shopping cart kickstand brake according to claim 17
wherein the control unit comprises a control panel and an operator control;
wherein the operator control is coupled to the control panel;
wherein the control panel is coupled to the handle of the shopping cart.

19. The shopping cart kickstand brake according to claim 18
wherein the operator control is an electrical control that controls energization of the motor;
wherein the operator control comprises a DEPLOY position and a RETRACT position;
wherein in the DEPLOY position, the operator control energizes the motor with the first electrical polarity such that the kickstand moves to the DEPLOYED position;
wherein in the RETRACT position, the operator control energizes the motor with the second electrical polarity such that the kickstand moves to the RETRACTED position.

* * * * *